United States Patent [19]

McFarland

[11] 4,278,896
[45] Jul. 14, 1981

[54] WIND POWER GENERATOR

[76] Inventor: Douglas F. McFarland, Davis City, Iowa 50065

[21] Appl. No.: 45,059

[22] Filed: Jun. 4, 1979

[51] Int. Cl.³ .......................... F03D 9/00; H02P 9/04; F03D 7/00
[52] U.S. Cl. ...................................... 290/55; 290/44; 416/DIG. 6; 415/2 R
[58] Field of Search .................................. 415/2, 3, 4; 416/DIG. 6; 290/44, 55

[56] References Cited

U.S. PATENT DOCUMENTS

| | | | |
|---|---|---|---|
| 1,063,973 | 6/1913 | Houston | 415/3 |
| 1,577,096 | 3/1926 | Aust | 416/DIG. 6 |
| 3,970,409 | 7/1976 | Luchuk | 416/145 |

*Primary Examiner*—Stanley J. Witkowski
*Assistant Examiner*—John B. Conklin

*Attorney, Agent, or Firm*—Zarley, McKee, Thomte, Voorhees & Sease

[57] ABSTRACT

A wind power generator comprising a vertically disposed support post having a support assembly rotatably mounted thereon which extends horizontally laterally therefrom. A plurality of vertically spaced rotor assemblies are rotatably mounted on the support assembly and are connected to an electrical generator so that electrical energy is generated as the rotors are rotated by wind. A wind deflector is mounted on each of the rotor assemblies for directing the wind towards to the rotor blades at a more efficient angle. The deflector also shields a portion of the rotor blades so that the wind is prevented from inhibiting the rotation of the rotor assembly. The rotor assemblies are maintained in a direction facing the wind by means of an adjustable stabilizer assembly.

5 Claims, 4 Drawing Figures

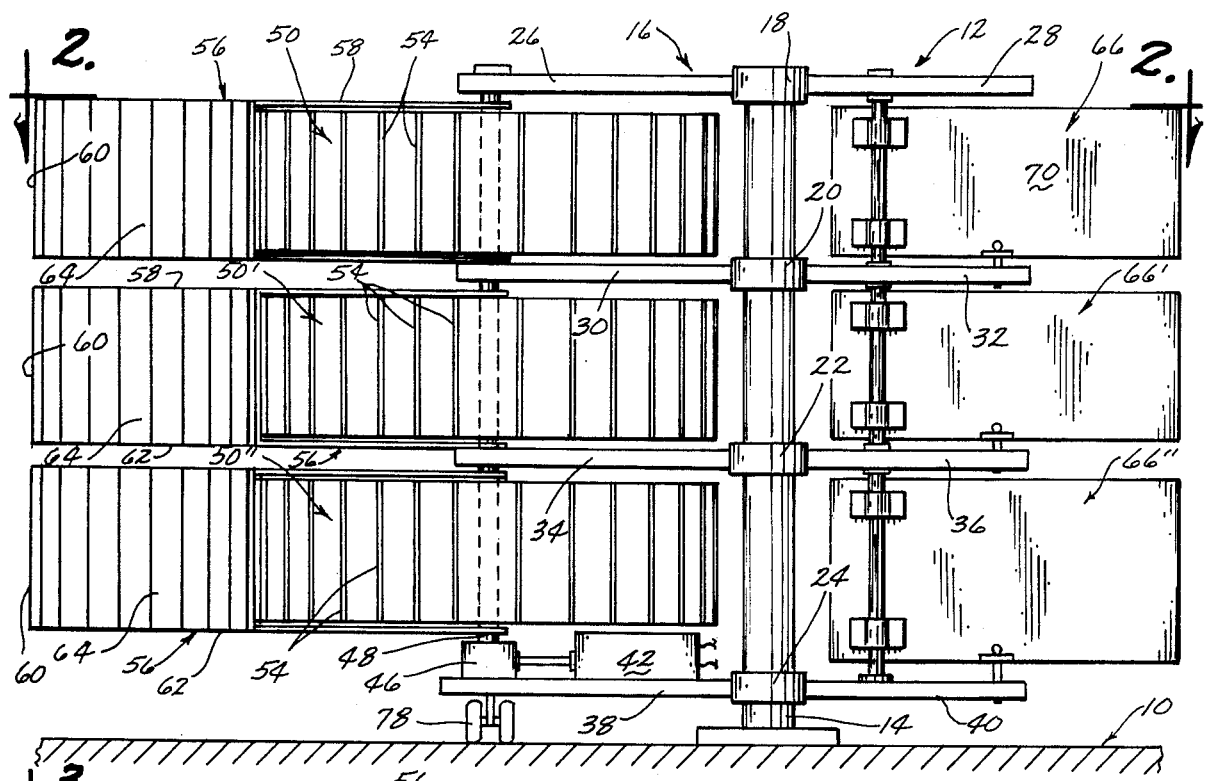
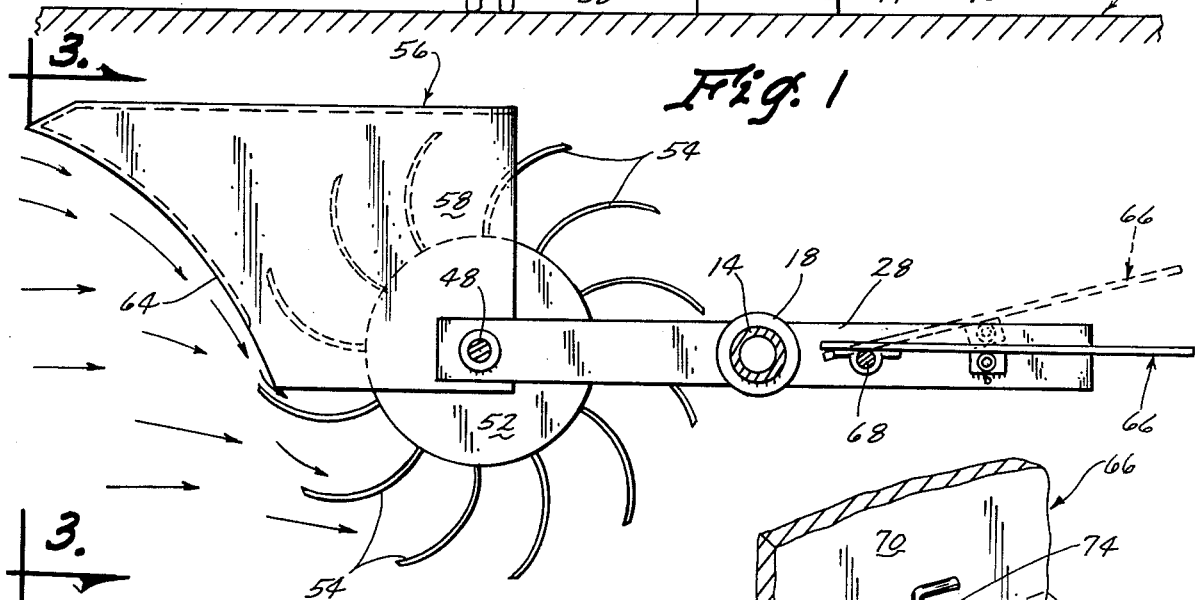
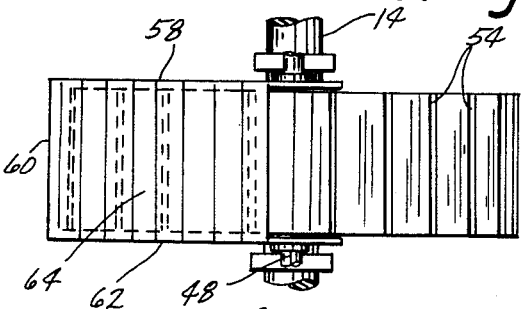
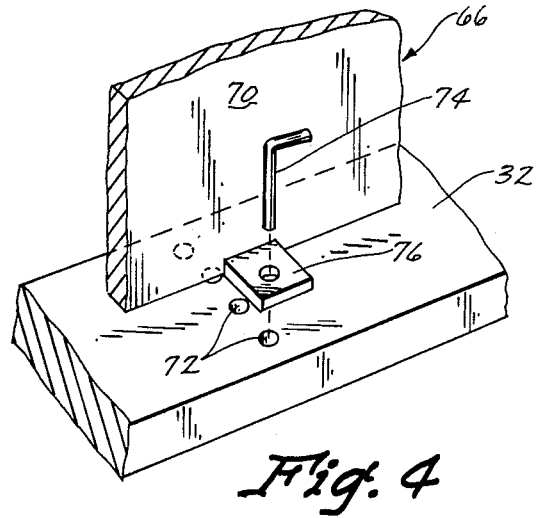
Fig. 1
Fig. 2
Fig. 3
Fig. 4

WIND POWER GENERATOR

BACKGROUND OF THE INVENTION

This invention relates to an improved wind power generator and more particularly to a wind power generator which includes means for enhancing the rotation of the rotor assemblies mounted thereon.

Wind power generators have been employed for many years for generating electrical energy. A large number of wind power generators have been previously developed but the efficiency of the same is somewhat less than desirable.

Therefore, it is a principal object of the invention to provide an improved wind power generator.

A further object of the invention is to provide a wind power generator including a rotor assembly having a wind deflector mounted thereon which not only deflects the wind towards the rotor blades at a more efficient angle but which also prevents the wind from inhibiting the rotation of the rotor.

A still further object of the invention is to provide a wind power generator which includes means for maintaining the rotors mounted thereon in a proper position relative to the wind.

A still further object of the invention is to provide a wind power generator which is economical of manufacture and durable in use.

These and other objects will be apparent to those skilled in the art.

BRIEF DESCRIPTION OF THE DRAWINGS

FIG. 1 is a side view of the wind power generator of this invention;

FIG. 2 is a sectional view as seen on lines 2—2 of FIG. 1;

FIG. 3 is an elevational view as seen on lines 3—3 of FIG. 2; and

FIG. 4 is a partial perspective view of the means for adjusting the position of the stabilizer assembly.

SUMMARY OF THE INVENTION

A vertically disposed support post is ground mounted and extends upwardly therefrom. A support means is rotatably mounted on the support post and extends laterally therefrom. A plurality of vertically spaced rotor assemblies are rotatably mounted on the support means and are operatively connected to a generator so that rotation of the rotor assemblies by the wind will cause the generation of electrical energy. A deflector is mounted on each of the rotor assemblies for deflecting the wind towards the rotor blades at a more efficient angle. The deflector also shields a portion of the rotor blades so that the wind does not inhibit the rotation of the rotor assembly. A stabilizer assembly is mounted on the support means opposite of the rotor assemblies for maintaining the rotors in a proper position relative to the wind.

DESCRIPTION OF THE PREFERRED EMBODIMENT

Referring to FIG. 1, the numeral 10 refers to a supporting surface such as the ground or the like while the numeral 12 refers generally to the wind power generator of this invention. Support post 14 is positioned on the ground 10 and extends upwardly therefrom. The numeral 16 refers generally to a support means which is rotatably mounted on post 14 and which extends horizontally laterally therefrom as illustrated in the drawings.

Support means 16 generally comprises bearings 18, 20, 22 and 24 which are mounted on the post 14. Arms 26 and 28 are secured to bearing 18 and extend horizontally outwardly therefrom in opposite directions. Likewise, arms 30 and 32 extend outwardly from bearing 20 while arms 34 and 36 extend outwardly from bearing 22. Arms 38 and 40 extend outwardly from bearing 24 as best illustrated in FIG. 1. The numeral 42 refers to an electrical generator mounted on arm 38 which is driven by shaft 44 extending from gear housing 46. Shaft 48 extends upwardly from gear housing 46 and extends through arms 34, 30 and 26. Rotor assemblies 50, 50' and 50" are mounted on shaft 48 as illustrated in FIG. 1. Inasmuch as all of the rotor assemblies are identical, only rotor assembly 50 will be described in detail.

Rotor assembly 50 includes a central hub 52 which is secured to shaft 48 for rotation therewith. A plurality of arcuate rotor blades 54 extend outwardly from hub 52 and dwell in a vertical plane. The numeral 56 refers to a wind deflector which is mounted on each of the rotor assemblies as best illustrated in FIGS. 1, 2 and 3. Deflector 56 includes a top wall 58, vertically disposed sidewall 60, bottom wall 62 and curved forward wall 64 which extends between top wall 58 and bottom wall 62. Top wall 58 is positioned above the rotor assembly while bottom wall 62 is positioned below the rotor assembly. The rearward end of deflector 56 is open as illustrated in the drawings to permit the rotor blades 54 to pass forwardly therethrough as the rotor is being rotated by the wind. As seen in FIG. 2, wall 64 terminates at a position so that the rotor blades 54 may pass outwardly from the deflector.

The numerals 66, 66' and 66" refer to stabilizer assemblies mounted on the support means as illustrated in FIG. 1. Inasmuch as each of the stabilizer assemblies is identical, only stabilizer assembly 66 will be described in detail. Post 68 extends between arms 28 and 32 and has the plate or stabilizer 70 rotatably mounted thereon about a vertical axis. As seen in FIG. 4, arm 32 is provided with a plurality of holes or openings 72 formed therein which are adapted to receive the pin 74 extending downwardly through bracket 76 which extends outwardly from the lower edge of the stabilizer 70. Thus, stabilizer 70 may be pivotally moved relative to post 68 and maintained in various positions by means of the pin 74 extending through bracket 76 and being received by one of the openings 72. As seen in FIG. 1, a support wheel apparatus 78 is positioned below the outer end of arm 38 and is in ground engagement to support the weight of the rotor assembly thereon.

In operation, the support means 16 is rotated with respect to the support post 14 so that the arms 26, 30, 34 and 38 are parallel to the wind so that the wind as illustrated by the arrows in FIG. 2 is blowing against the rotor assembly. A portion of the wind directly attacks or engages the rotor blades 54 but a portion of the wind is also directed or deflected by the wall 64 so that the wind is directed onto the blades 54 at a more efficient angle thereby increasing the efficiency of the rotor. A very important feature of the deflector 56 is that it also shields a portion of the rotor assembly from the wind as the blades are on their "return" path. If wall 64 was not present, the wind would tend to engage the returning rotor blades which would inhibit rotation of the rotor.

The stabilizers 66, 66' and 66" are also important in that they tend to maintain the rotor assemblies into the face of the wind by means of the wind flowing over opposite sides of the stabilizers. The adjustability feature of the stabilizers permits the stabilizers to be selectively adjusted in the event that the wind, in engaging the deflector 56, tends to rotate the assembly somewhat out of alignment. In other words, the position of the stabilizers may be adjusted to compensate for any undesirable rotation of the assembly which may be caused by the force of the wind against the wall 64.

Thus, rotation of the rotor assemblies causes rotation of shaft 48 which in turn causes the generator 42 to create electrical energy. The device is extremely efficient and requires very little maintenance during operation. The apparatus of this invention is automatically maintained in the proper attitude relative to the wind so that energy is efficiently generated. Thus it can be seen that the apparatus of this invention accomplishes at least all of its stated objectives.

I claim:

1. A wind power generator comprising,
a vertically disposed support member,
a support means rotatably mounted about a first vertical axis on said support member and extending horizontally laterally therefrom,
at least one rotor means rotatably mounted on said support means about a second vertical axis situated on one side of said first vertical axis and radially spaced therefrom, said rotor means including a plurality of rotor blades dwelling in a vertical plane,
a wind deflector means mounted on said support means in stationary relation thereto for deflecting the wind towards said blades to improve the angle of attack of the wind on said blades and for shielding a portion of said rotor means from the wind to prevent the wind from inhibiting the rotation of said rotor means,
an electrical generator means operatively connected to said rotor means for generating electrical energy upon said rotor means being rotated by the wind,
and a stabilizer assembly mounted on said support means on the opposite side of said first vertical axis such that said stabilizer assembly will be moved by the wind to the leeward side of said support member thereby maintaining said rotor means and wind deflector means on the windward side of said support member.

2. The apparatus of claim 1 wherein a plurality of vertically spaced rotor means are mounted on said support means.

3. The apparatus of claim 1 wherein said stabilizer assembly comprises a vertically disposed stabilizer plate means.

4. The apparatus of claim 3 further comprising means for mounting said stabilizer assembly on said support means for rotation about a vertical axis and means for securing said stabilizer assembly in selected pivotal positions relative to said mounting means.

5. The apparatus of claim 4 wherein a plurality of vertically spaced stabilizer plate means are mounted on said support means.

* * * * *